Patented Aug. 3, 1954

2,685,505

UNITED STATES PATENT OFFICE 2,685,505

MANUFACTURE OF SODIUM

Alden J. Deyrup, Niagara Falls, N. Y., assignor to E. I. du Pont de Nemours and Company, Wilmington, Del., a corporation of Delaware No Drawing. Application June 27, 1951, Serial No. 233,949

8 Claims. (Cl. 75—66)

This invention relates to the manufacture of sodium and more particularly to the production of sodium by carbon reduction of sodium compounds.

Prior to the introduction of the electrolytic processes now generally used for the manufacture of sodium, this metal was made by thermal reactions involving carbon reduction of sodium carbonate or sodium hydroxide. In the manufacture of sodium by the carbon reduction of sodium carbonate at temperatures around 1100° C., the reaction product is a gaseous mixture of sodium vapor and carbon monoxide, which is cooled to condense out the sodium. Successful operation of this process required a sudden and rapid cooling and condensation of sodium, since if the gaseous mixture is cooled too slowly, a large part of the sodium vapor reacts with the carbon monoxide to form carbon and sodium carbonate, thus decreasing the yield.

In previous attempts to improve the carbonate reduction process for the manufacture of sodium, various means have been proposed for rapidly cooling the reaction mixture to condense out the sodium. Proposed cooling means have included cooled surfaces, large volumes of cooling gases rapidly mixed with the reactant off-gases and liquid coolants such as molten lead or molten tin. For example, in the process of McConica et al. U. S. P. 2,391,728 the reaction off-gases from the carbon reduction of sodium carbonate are rapidly brought into contact with a shower of molten lead, whereby the gases are suddenly cooled to below the temperature of the reversion reaction and the sodium vapor is condensed and dissolved in the molten lead. The resulting sodium lead alloy then may be distilled, e. g., under vacuum to recover sodium therefrom. This method requires large quantities of molten metal, power to pump the same and additional heat to distill out sodium from the cooled lead alloy.

An object of the present invention is an improved method for the manufacture of sodium by the carbon reduction of sodium compounds. A further object is the separation of sodium from the mixture of sodium vapor and carbon monoxide such as that resulting from sodium carbonate reduction, while preventing or minimizing reaction between the carbon monoxide and sodium.

The above stated objects may be attained in accordance with the present invention by reacting soda ash or caustic soda with carbon at a temperature of 1050 to 1200° C. and passing the resulting mixture of carbon monoxide and sodium vapor at a temperature of 900 to 1200° C. in contact with molten tin. The tin absorbs the sodium from the gas mixture, substantially without change in temperature, and the carbon monoxide passes through unchanged. Although the temperature of the molten tin is around 200 to 300° C. above the boiling point of sodium, I have made the unexpected discovery that at such temperature the tin absorbs up to about 7% of its weight of sodium. As the temperature of the gaseous mixture in contact with the molten tin is above that at which the reversion reaction occurs, little or no reaction occurs between the sodium and carbon monoxide. After the tin has absorbed sufficient sodium to form a sodium-tin alloy containing 1 to 7% by weight of sodium, the sodium may be removed from the molten alloy by passing in contact therewith an inert gas such as nitrogen, which removes the bulk of the sodium from the sodium alloy at a temperature above the boiling point of the sodium; and the resulting mixture of inert gas and sodium vapor may be cooled to condense out liquid sodium in a substantially pure state.

The invention is illustrated by the following example:

*Example*

An iron retort was arranged with a short connection to one end of a horizontal cylindrical iron tube, the tube being designated as the "absorber." The retort, connection to the absorber, and the end of the absorber adjacent to the retort were enclosed in a conventional furnace setting, with the opposite end of the absorber extending outside the furnace. A section of the absorber, at the end inside the furnace was filled with a mixture of 30–60 mesh granular silicon carbide and 30 mesh granular tin in the proportions of 20% by weight of tin. The absorber was provided with inlet and outlet pipes at either end. The pipe leading from the other end of the absorber inside the furnace was connected to a closed receiver located outside the furnace. Suitable connections were provided for passing nitrogen through the absorption tube in either direction and through the retort.

A mixture of coke and soda ash was placed in the retort and nitrogen was passed through the apparatus to sweep out the air. The retort and absorber tube then were heated to about 1100° C., which resulted in a flow of carbon monoxide from the end of the absorber extending out of the furnace. During this time, a slow stream of oxygen-free nitrogen was passed through the system, cocurrent with the reaction products. After a time, the carbon monoxide leaving the absorber burned with a yellow flame, indicating the presence of sodium. The reaction in the retort then was stopped by cooling the retort to a temperature below 1050° C., while the nitrogen flow was continued a few minutes to sweep out residual carbon monoxide, the temperature of the absorber being maintained at about 1100° C.

Then, while maintaining the absorber temperature at the same temperature, nitrogen was passed through the absorber in the reverse direction, causing a mixture of nitrogen and sodium vapor to flow out through the pipe connected to the end of the absorber inside the furnace. The sodium condensed in the portion of this pipe between the furnace and the receiver, and molten sodium was collected in the receiver.

The above cycle then was repeated. The data for the two cycles of operation were:

Charge to retort:
    Coke (200 mesh) _____grams__ 72
    Soda ash _____do____ 159
Sodium metal collected in receiver___do____ 5.4
Retort volume_____cu. in__ 25

Absorber Tin–SiC packing, 1.5 in. diameter x 7 in. long:
    Tin _____grams__ 120
    SiC _____do____ 480

Temperatures:
    Retort (during reaction) _____° C__ 1070 to 1110
    Absorber (continuously) __° C__ 1100 to 1125

Operation, 2 Cycles:
    Total reaction time_____minutes__ 100
    Total time to remove residual CO_do____ 13
    Total desorption time_____do_____ 100

In practicing my invention, the reaction between the carbon and soda ash may be carried out in the conventional manner, for example, by heating in an iron or steel retort. Preferably stoichiometric or nearly stoichiometric proportions are used, and preferably the ingredients are finely divided (e. g., 50 to 200 mesh) and premixed before charging to the retort. If desired, caustic soda, or a mixture of caustic soda and soda ash may be used in place of the soda ash. Various forms of amorphous carbon may be used, e. g., coke or charcoal. Preferably, the reaction ingredients are conventionally pretreated to remove moisture and other volatiles, for example, volatile organics in charcoal.

The reaction temperature is in the neighborhood of 1100° C., and not lower than 1050° C. If desired, the temperature may be carried to 1200° C. and even higher, but generally there is no advantage in exceeding 1150° C.

The molten tin serving to absorb sodium from the reaction off-gas must be maintained at a temperature of 900 to 1200° C. and the reaction off-gas temperature must not fall below 900° C. during its passage from the reaction retort and its contact with the molten tin. At temperatures below 900° C. the carbon monoxide-sodium reversion reaction tends to occur. At temperatures above 1200° C., the tin does not effectively absorb the sodium. The best results generally are obtained at reaction and absorption temperatures of 1100 to 1150° C., with substantially no cooling of the reaction off-gas.

Preferably the sodium is removed from the molten tin when sufficient sodium is absorbed to form an alloy containing 1 to 7% by weight of sodium. Desorption effected when the sodium content falls below about 1% generally is uneconomical. Absorption carried to above about 7% sodium content in the alloy usually results in incomplete removal of the sodium from the reaction off-gas.

The molten tin absorption system may be constructed and operated in various ways in accordance with conventional engineering practice for contacting a gas with a liquid, limited only by the above stated temperature requirements and the chemical and physical properties of the materials handled. One method consists in passing the reaction gases over one or more shallow pools of molten tin. Alternatively, the tin may flow, either co-currently or counter-currently to the flow of reaction off-gas, either as a substantially horizontal stream, or substantially vertically, as in a packed or baffled scrubbing tower. Or, in another method, the reaction off-gas may be passed horizontally in contact with down-flowing streams or droplets of molten tin. In all these methods, the temperature of the molten tin and the gases must lie within the range of 900 to 1200° C., to prevent the reversion reaction.

The preferred molten tin absorption system comprises a stationary absorption bed of granular silicon carbide or other suitable granular refractory having droplets of molten tin distributed therethrough, as described and claimed in the copending application for Letters Patent by A. J. Deyrup and J. J. Knox, Serial No. 233,950, filed of even date herewith.

A preferred method for making this tin absorption bed comprises mixing refractory granules or particles with granules or particles of solid tin at a temperature below the melting point of tin (e. g., at atmospheric temperature) in the desired proportions, so as to form a mass of refractory granules having distributed substantially uniformly throughout small granules of solid tin. This mixture is then packed in a suitable container provided with gas inlet and outlet means arranged to pass a gas through the bed of granular material in the container. When the bed of granular material is heated to above the melting point of tin, the tin granules are converted to tin droplets distributed throughout the bed.

For efficient operation, it is desired to have the tin content of the absorption bed as high as possible but not so high as to cause the drops of tin to coalesce; for if coalesced masses of tin become too large, much of the tin will be lost by gravity flow from the bed. To avoid this occurrence, generally the amount of tin in the absorption bed should not exceed about 25% by weight. Preferably, the absorption bed will be composed of refractory material of 4 to 50 mesh size, containing tin droplets not exceeding about 4 mesh size in a proportion of from 1 to 20% by weight of tin in the bed.

In one method for the preparation of the mixture of tin and refractory granules, the granular mixture is first wet with a volatile liquid such as water, methanol, hydrocarbon oil or the like and the wet granules then are mixed together by conventional mixing means, for example, tumbling in a horizontal cylindrical rotating container until thorough mixing has been obtained, after which warm air or other suitable gas may be passed through the mass to remove the volatile liquid. Preferably, the mixture is packed in the container in which it is to be used as an absorption bed before removal of the volatile liquid. The function of the volatile liquid is to cause slight adherence of the tin and refractory granules to each other so as to compensate for the difference in specific gravity between the tin and refractory which otherwise tends to cause segregation of the tin when the mass is stirred or tumbled.

Other methods of forming the absorption bed may be utilized, for example, mixing the refractory material with molten tin and agitating the mixture while cooling to form tin granules in situ. However, the best results generally are secured by mixing the granular refractory with tin particles below the melting point of tin. The solid tin particles thus mixed with the refractory may vary in size from fine powders on the order of 100 to 200 mesh size up to granules of 4 mesh size, resulting in droplets of molten tin of approximately the same size.

While silicon carbide is the preferred refractory material, other refractories which are chemically inert to the gas mixture (carbon monoxide and sodium vapor) and to tin at the operating temperature and which are sufficiently refractory in nature may be utilized in place of silicon carbide. A sufficiently refractory material is one which does not melt or decrepitate at the operating temperature. It is essential, however, that the refractory material be one whose surfaces is not readily wet by molten tin. The success of the operation depends upon maintaining the tin droplets as discrete drops distributed throughout the mass of granular refractory; and this condition will not prevail if the molten tin wets the surface of the refractory granules to any considerable extent. Examples of refractories other than silicon carbide which may be utilized in the practice of the invention are alumina and graphite.

While tin of relatively high purity is generally to be preferred, relatively low grade tin, e. g., containing as high as 10% of impurities (whether metallic or non-metallic) generally can be used effectively in the absorption bed.

The construction of the absorber (wherein the reaction off-gas is contacted with molten tin) preferably should be such as to avoid or minimize contact of molten tin with iron or steel. At the temperature employed, tin tends to alloy with iron to some extent, contributing to a short life of the equipment. For example, in contacting the gases with pools of molten tin, the latter may be held in shallow graphite containers, enclosed in an insulated steel or iron shell. Graphite also is preferably used as lining and packing for absorption towers. If the refractory-tin granular absorption bed is employed, it may be confined in a steel or iron shell (preferably suitably insulated against heat loss), but the life of such equipment is prolonged by lining the shell with graphite, silicon carbide or other refractory which will prevent contact of tin with the iron or steel shell. The reaction retort and the conduit leading from the retort to the absorber may be made of iron or steel. Scale resistant alloys may well be used for external parts of equipment exposed to furnace combustion gases.

Means for applying heat to the retort and absorber, and means for conducting the gases may be constructed according to conventional chemical engineering practice. Any mode of construction, however, must be adapted to maintain the tempearture of the reaction off-gases at a temperature not lower than 900° C., and preferably not lower than 1100° C., throughout their travel from the reaction in the retort through the absorber. After passing through the absorber, the residual gas is mainly carbon monoxide, substantially free from sodium vapor, and may be cooled or otherwise disposed of as desired. For example, this carbon monoxide off-gas may be utilized, with or without cooling, as fuel to heat the retort and absorber.

The absorption capacity of the absorber will depend upon the amount of tin therein. The absorber may be made sufficiently large to absorb the entire sodium production from a single retort charge. Alternatively, the absorber capacity may be a fraction of the production of the retort charge, in which case, two or more absorbers may be employed, diverting the reaction off-gases from one to another. Then, while one absorber is absorbing sodium, sodium may be removed from another by passing through nitrogen.

In place of nitrogen, I may use other gases inert to sodium to remove sodium from the molten tin, for example, argon, helium or the like. Nitrogen is preferred for economic reasons.

While the invention preferably is operated as above described to produce metallic sodium, it is not restricted thereto. If desired, the process may be employed to produce a tin alloy containing up to 7% of sodium. Also, if operated to desorb sodium from the molten tin, the resulting mixture of nitrogen and sodium vapor may be fed into contact with appropriate reagents by conventional procedures to produce valuable sodium compounds such as sodium oxides, sodium hydride, sodium cyanamide and sodium cyanide.

I claim:

1. The method of removing sodium vapor from a mixture of gases containing said vapor which comprises contacting the mixture with molten tin having a temperature of about 900°–1200° C. and thereby absorbing the sodium from the mixture at a temperature above the boiling point of sodium.

2. The method of separating sodium vapor from a mixture of gases containing said vapor which comprises contacting said mixture with molten tin having a temperature of about 900–1200° C. and thereby absorbing sodium in said tin at a temperature above the boiling point of sodium and subsequently removing at least a portion of the sodium from the resultant tin-sodium alloy by passing a relatively inert gas in contact with said alloy at a temperature of 900–1200° C.

3. The method of claim 2 in which the relatively inert gas is nitrogen.

4. The process which comprises reacting carbon with an alkali selected from the group consisting of soda ash and caustic soda at a temperature of 1050–1200° C., contacting the resultant mixture of carbon monoxide and sodium vapor with molten tin having a temperature of 900–1200° C. and absorbing the sodium vapor from said mixture in the tin at a temperature above the boiling point of sodium.

5. The process for the production of sodium which comprises reacting carbon with soda ash at a temperature of 1050–1200° C., contacting the resultant mixture of carbon monoxide and sodium vapor with molten tin having a temperature of 900–1200° C., absorbing sodium in said tin at a temperature above the boiling point of sodium until the sodium content of the resultant tin-sodium alloy reaches 1–7% by weight and thereafter passing a gas chemically inert to tin and sodium in contact with said alloy at a temperature of 900–1200° C. until at least a portion of the sodium has been removed from said alloy.

6. The process for the production of sodium which comprises reacting carbon with soda ash at a temperature of about 1100°–1150° C., contacting the resultant mixture of carbon monoxide and sodium vapor with molten tin having a temperature of about 1100–1150° C., absorbing said sodium vapor in said tin without substantially reducing the temperature thereof until the sodium content of the resulting tin-sodium alloy reaches about 1–7%, thereafter passing nitrogen in contact with said alloy at a temperature of 900–1200° C. until at least a portion of the sodium has been removed from the alloy and subsequently cooling the resulting mixture of nitrogen and sodium vapor to condense sodium metal therefrom.

7. The method of forming an alloy of sodium and tin which comprises contacting molten tin having a temperature of about 900–1200° C. with a gas containing sodium vapor and thereby absorbing sodium in said tin at a temperature above the boiling point of sodium.

8. The method of claim 7, characterized in that the alloy formed thereby contains between about 1% and about 7% sodium by weight.

References Cited in the file of this patent

UNITED STATES PATENTS

| Number | Name | Date |
|---|---|---|
| 2,391,728 | McConica 3rd et al. | Dec. 25, 1945 |
| 2,456,935 | Fisher | Dec. 21, 1948 |

FOREIGN PATENTS

| Number | Country | Date |
|---|---|---|
| 410,652 | Great Britain | May 24, 1934 |
| 610,878 | Great Britain | Oct. 21, 1948 |